United States Patent [19]

Simpson

[11] Patent Number: 4,835,917
[45] Date of Patent: * Jun. 6, 1989

[54] MEMBRANE SUPPORTED REROOFING SYSTEM

[75] Inventor: Harold G. Simpson, Mustang, Okla.

[73] Assignee: Harold Simpson, Inc., Oklahoma City, Okla.

[*] Notice: The portion of the term of this patent subsequent to Jun. 4, 2002 has been disclaimed.

[21] Appl. No.: 927,315

[22] Filed: Nov. 4, 1986

Related U.S. Application Data

[63] Continuation-in-part of Ser. No. 713,319, Apr. 22, 1985, Pat. No. 4,620,397, Ser. No. 503,299, Jun. 10, 1983, Pat. No. 4,534,148, Ser. No. 487,614, Apr. 22, 1983, Pat. No. 4,520,610, and Ser. No. 745,320, Jun. 14, 1985.

[51] Int. Cl.⁴ .............................................. E04B 1/00
[52] U.S. Cl. ......................................... 52/63; 52/273; 52/741
[58] Field of Search ................... 52/222, 63, 273, 741, 52/640

[56] References Cited

U.S. PATENT DOCUMENTS

| | | | |
|---|---|---|---|
| 4,520,610 | 6/1985 | Simpson | 52/745 |
| 4,534,148 | 8/1985 | Simpson | 52/640 |
| 4,677,795 | 7/1987 | Mathews et al. | 52/273 X |

FOREIGN PATENT DOCUMENTS

| | | | |
|---|---|---|---|
| 2021074 | 11/1970 | Fed. Rep. of Germany | 52/222 |
| 2019022 | 11/1971 | Fed. Rep. of Germany | 52/222 |

Primary Examiner—Carl D. Friedman
Attorney, Agent, or Firm—Bill D. McCarthy

[57] ABSTRACT

An improved roof system in which an elastomeric flexible membrane is disposed as a protective roof layer over roofing members supported by adjustable roofing support spacers over a preexisting roof. Strips of the membrane are joined together by hidden fastener assemblies which sealingly grip adjacent membrane edges and which attach the membrane to the underlying support spacers.

18 Claims, 9 Drawing Sheets

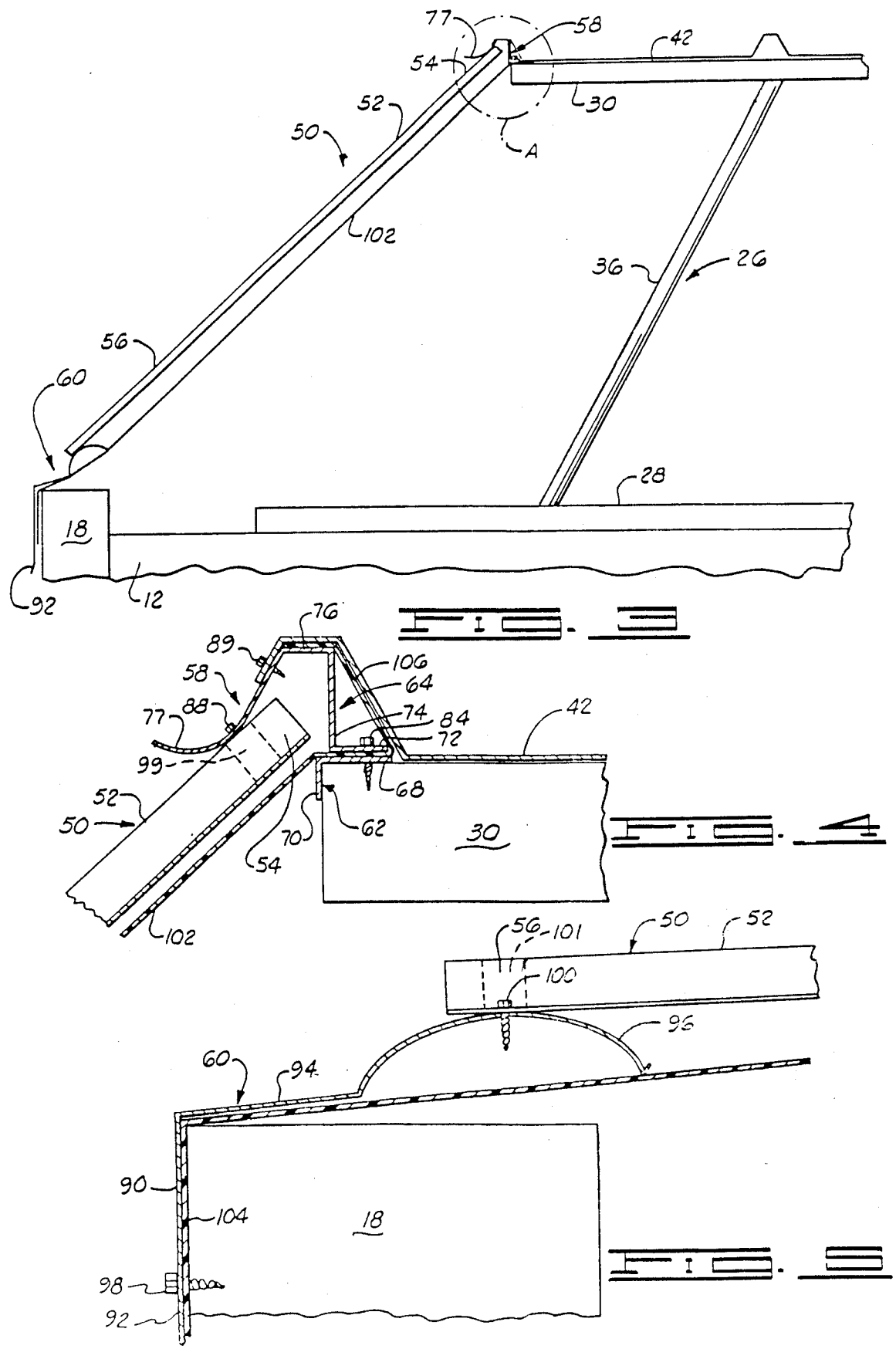

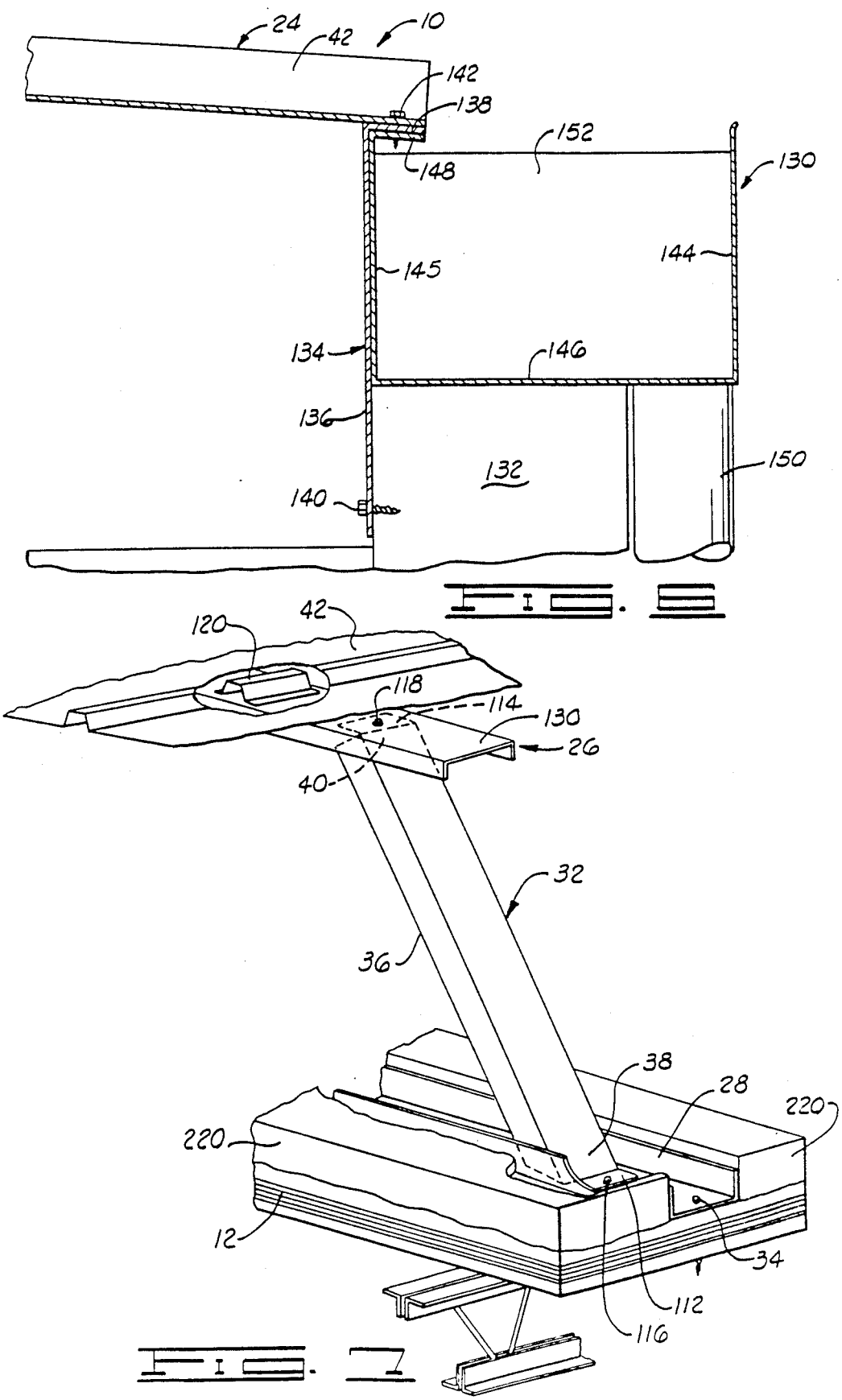

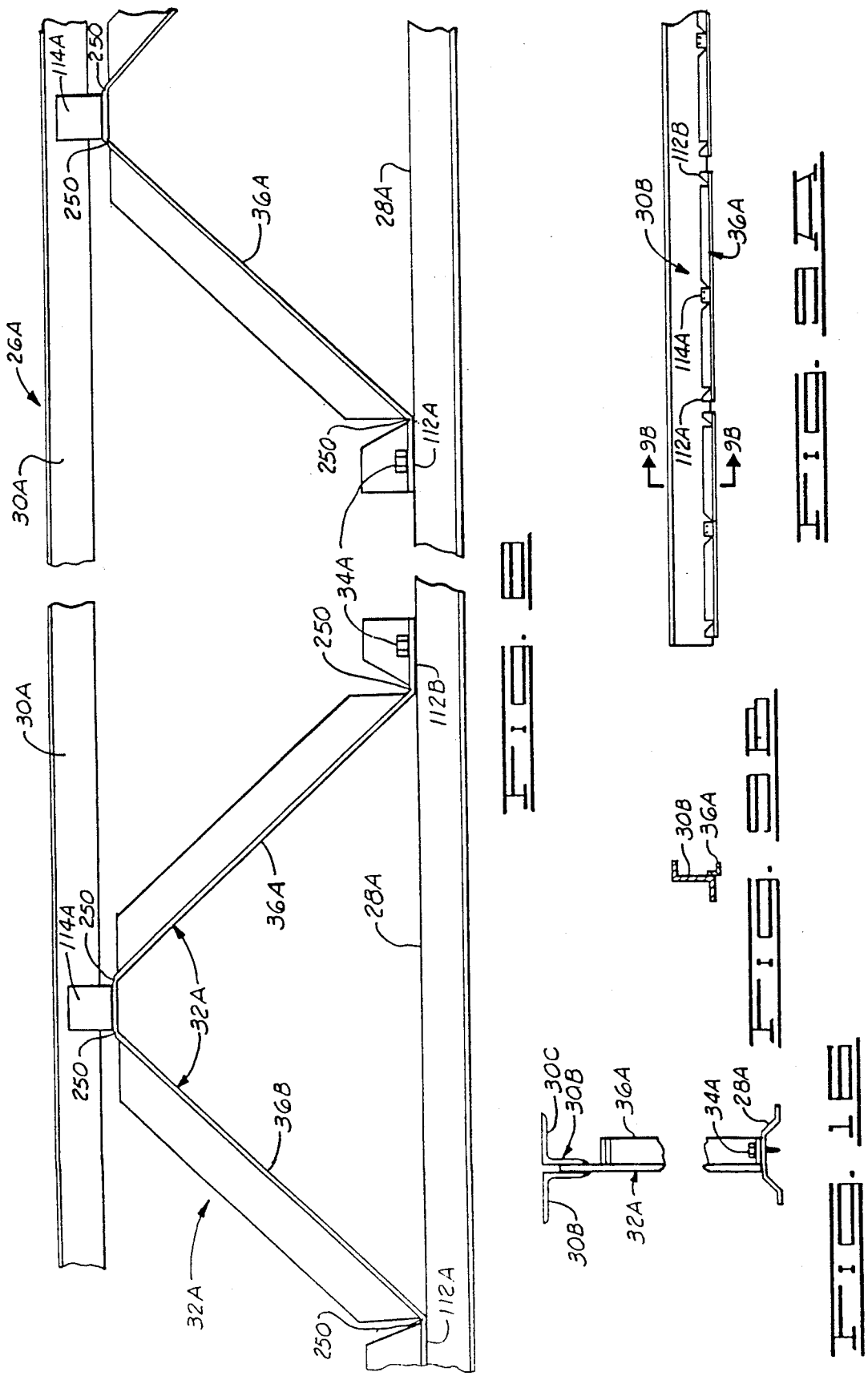

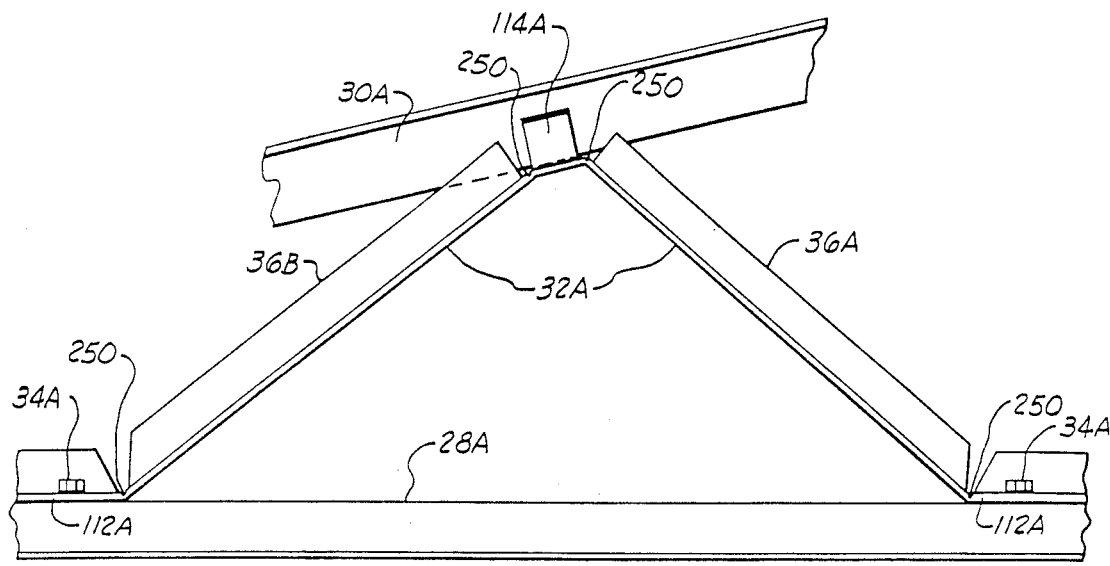
FIG. 10
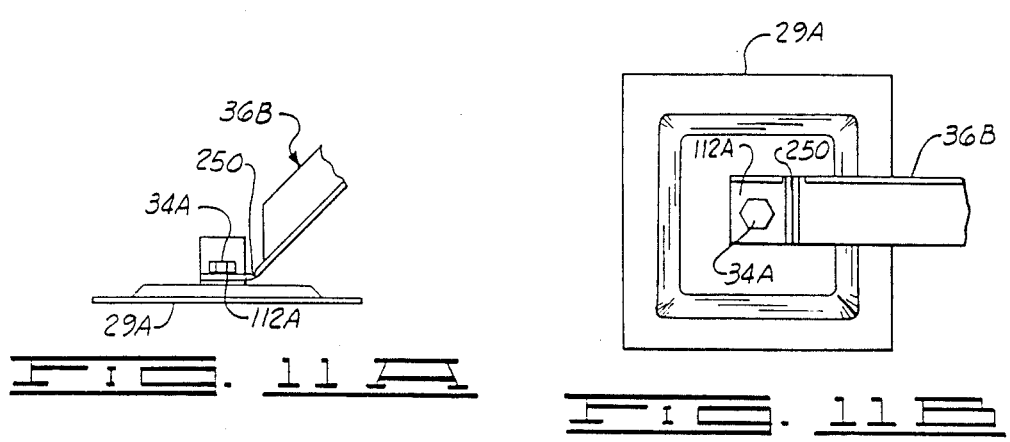
FIG. 11A
FIG. 11B
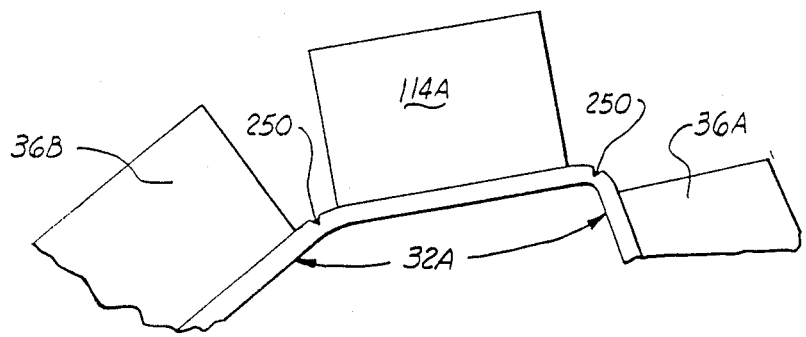
FIG. 12

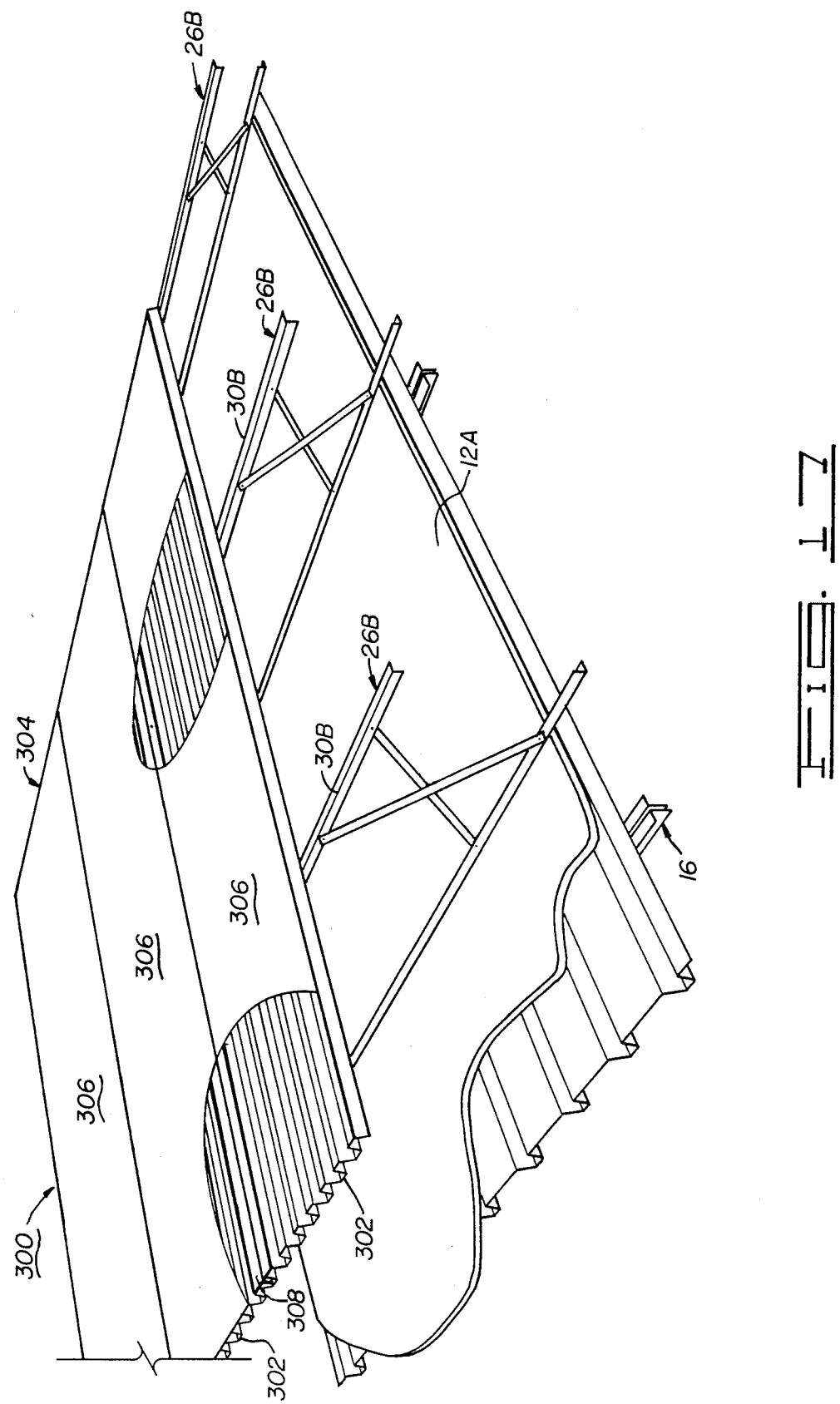

MEMBRANE SUPPORTED REROOFING SYSTEM

CROSS REFERENCED TO RELATED APPLICATIONS

The present application is a continuation-in-part of the following: (1) U.S. patent application Ser. No. 713,319 filed Apr. 22, 1985 and now pending; (2) U.S. Pat. No. 4,534,148, (Ser. No. 503,299 filed June 10, 1983) issued Aug. 13, 1985; (3) U.S. Pat. No. 4,520,610 (Ser. No. 487,614 filed Apr. 22, 1983) issued June 4, 1985; and (4) U.S. patent application Ser. No. 745,320 filed June 14, 1985. These applications and patents are incorporated herein by reference insofar as may be required.

BACKGROUND OF INVENTION

1. Field of the Invention

The present invention relates generally to the field of roofing systems for building structures, and more particularly but not by way of limitation, to an improved reroofing system in which flexible membrane members are sealingly interconnected to provide a protective roof layer.

2. Discussion of the Prior Art

Numerous types of building roof assemblies have been proposed to provide a watertight roof, while at the same time, enabling the roof to expand and contract as changes in the temperature are encountered. One particular type of roof assembly is a substantially flat roof assembly referred to in the construction industry as a "built-up" roof. Generally, a built-up roof assembly is formed of a plurality of sections which are interconnected and overcoated with asphaltic composition to provide a watertight seal. While such roof assemblies have found generally good success, problems have nevertheless been encountered in that as the built-up roof assembly ages, or the building settles, or construction errors are encountered, the altered slope of the built-up roof often results in poor water drainage, and as a consequence, water stands in pockets on the roof. This standing water often results in deterioration of the roof assembly and causes leaks.

In an effort to repair a roof assembly which has been damaged by the elements, or which has developed leaks, problems have been encountered in repairing the roof assembly in a satisfactory manner to prevent similar occurrences. Thus, a long recognized need for a reroofing assembly not requiring substantial modification to a preexisting roof assembly, and economical both in fabrication and on-site construction, was taught in my previously granted U.S. Pat. Nos. 4,520,610 and 4,534,148. These new roof assemblies are capable of altering the planar surface of the newly applied roof in a manner independent to the variations in the underlying surface of the preexisting roof. Also, these new roof assemblies avoid exposing the building interior to the elements during the reroofing process, as no openings in the roof need be made during reroofing.

The present invention provides a single-ply roof system which is supportable on the adjustable spacers introduced in my previous patents.

SUMMARY OF THE INVENTION

The present invention provides a roof system in which longitudinally extending strips of elastomeric flexible membrane material are disposed to provide a protective roof layer over a supporting substrate, such as the adjustable spacers of my above mentioned U.S. patents. An improved fastening assembly sealingly interconnects adjacent edges of the material in which first and second gripping members are disposed along and under the adjacent edges of the strips, and securing devices force the gripping members together so that the edges of the membrane strips sealingly press together, with the interconnected membranes covering the gripping and securing members. Preferably, at least one of the gripping members is attached to an underlying support structure with headed fasteners provided with protective covers of self-positioning separators.

A primary object of the present invention is to provide an improved roofing system having interconnected membrane strips sealingly joined with minimum penetration.

Another object of the present invention, while achieving the above stated objects, is to provide an improved fastening system to sealingly interconnect strips of flexible membrane material supported as part of a roofing system.

Other objects, advantages and features of the present invention will become evident upon a reading of the following detailed description when read with the accompanying drawings and appended claims.

BRIEF DESCRIPTION OF THE DRAWINGS

FIG. 3 is an enlarged, partially broken sectional view of the roof system taken at 3—3 in FIG. 1.

FIG. 4 is an enlarged, partially broken sectional view showing the interconnection of flashing to a roof panel on the roof system and area A in FIG. 3.

FIG. 5 is an enlarged, partially broken sectional view showing the interconnection of the flashing to a wall of the preexisting structure.

FIG. 6 is an enlarged, partially broken sectional view of the roof system taken at 6—6 in FIG. 1.

FIG. 7 is an enlarged, partially broken view of one view of this support spacer.

FIG. 8 is an enlarged, partially broken view of the adjustable spacer using an inverted "V" shaped web member.

FIG. 9A is a partially broken view of the "Z" shaped upper beam and the attached collapsed inverted "V" shaped web members shown in the shipping position. FIG. 9B is a side view of 9A.

FIG. 10 is a view an inverted "V" web member and "Z" shaped upper beam where the upper beam is shown at a slope relative to the lower beam.

FIG. 11A is a side view of a base plate attachable to the preexisting roof. FIG. 11B is a top plan view of the base plate.

FIG. 12 is an isometric view of the upper portion of the inverted "V" web member showing the bend scores.

FIG. 16 is a partially broken side view of the inverted "V" shaped web member utilizing a split upper beam.

FIG. 17 is a partially broken, isometric view of another roof system supported over a preexisting roof view adjustable roof support spacers.

DESCRIPTION

Like numerals will be used in the figures to designate like components or assemblies.

Figure 1:
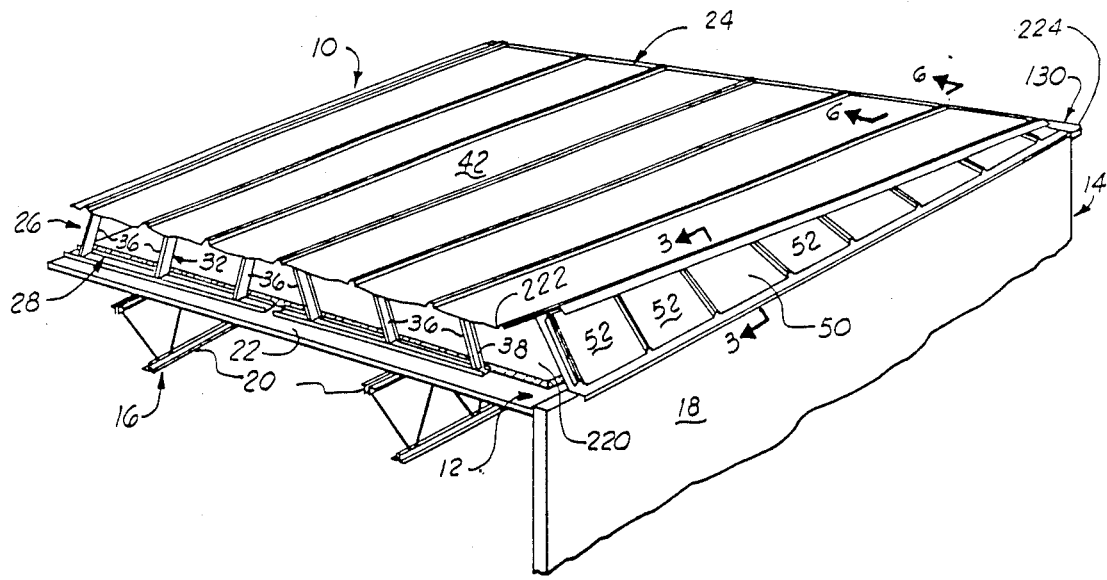
FIG. 1 is a partially broken, isometric view of a structure showing a portion of a roof system supported over a preexisting roof via adjustable roof support spacers.

Referring to the drawings, and more particularly to FIG. 1, a portion of a roof system 10 is supported by a preexisting roof 12 of a building structure 14. The preexisting roof 12 of the building structure 14 can be any preexisting roof structure, such as a built-up roof, which is connected to and supported by conventional elements, such as a primary structural system (not shown), a secondary structural system 16 and a plurality of wall members 18 (only one being shown). The primary structural system of the building structure will generally consist of a plurality of upwardly extending column members that are rigidly connected to a foundation and a plurality of primary beams which are generally horizontally disposed and supported by the column members. The secondary structural system 16 comprises a plurality of open web beams or trusses 20, sometimes referred to as bar joists, which are supported by the primary beams and walls of the building structure 14. The trusses 20 are generally horizontally disposed.

The roof system 10 will generally be formed of a plurality of roof sections such as section 24 illustrated in FIG. 1. The roof sections 24 of the roof system 10 are connected to provide a roof plane for the roof system 10 having a desired configuration. For example, the roof sections of the roof system 10 can be disposed on the preexisting roof 12 such that, upon interconnection of adjacent roof sections, a multipitched roof is formed. On the other hand, the roof sections can be joined such that the roof system 10 is provided with a substantially single roof plane, i.e. a roof plane having a unidirectional slope.

The roof section 24 of the roof system 10 is supported by a plurality of adjustable roofing support spacers 26 disposed along the upper side or surface 22 of the preexisting roof 12 of the building structure 14. Each of the support spacers 26 extends upwardly from the preexisting roof 12 in a substantially parallel relationship with the adjacently disposed support spacers 26, forming a new roof plane for attachment of the roof sections 24.

Figure 2A:
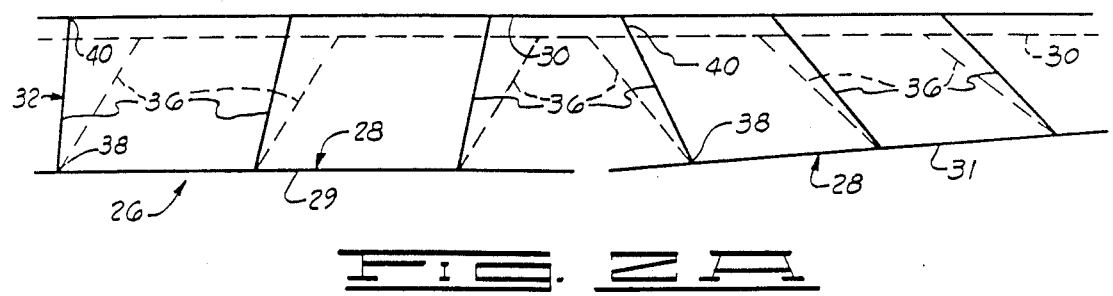
FIG. 2A is a schematic line drawing of an adjustable roofing support spacer wherein the upper beam and base support members of the spacer are in a substantially non-parallel relationship when the spacer is in the assembled position.
Figure 2B:
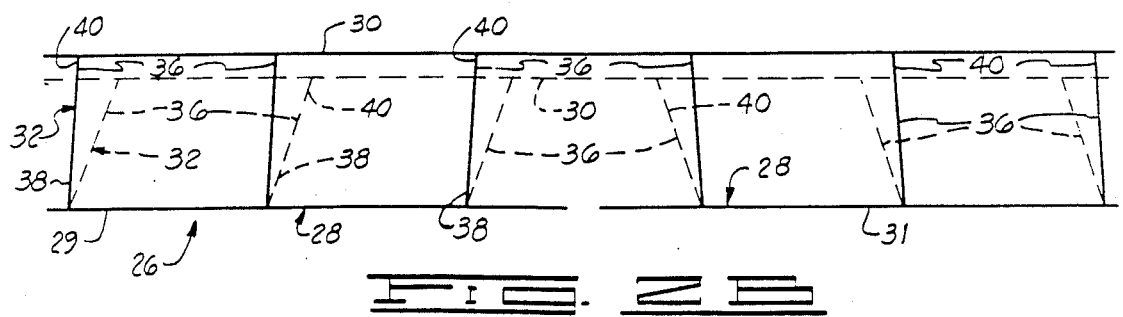
FIG. 2B is a schematic line drawing of the support spacer with the upper beam and base support member in a substantially parallel relationship when the spacer is in an assembled position.

Referring now to FIGS. 2A and 2B, each support spacer 26 is characterized as having a base support member 28, a spatially disposed upper beam 30 and an adjustable web assembly 32 interconnecting the base support member 28 and the upper beam 30. The base support member 28 may be formed as continuous segment or as a plurality of segments, as shown in the drawings. When the base support member 28 is formed of a plurality of segments, such as segments 29 and 31, the base support member 28 is adapted to more readily fit the contour of the preexisting roof 12. The base support member 28 provides for load distribution across the area of the base support member 28 onto the preexisting roof 12 in contrast to the concentrated load point that would be present at the lower end of the web assembly 32, were the same support member 28 not there to distribute the load. The web assembly 32 is connected to the upper beam 30 and the base support member 28 at various positions so that the upper beam 30 of each of the support spacers 26 is disposed a selected height above its base support member 28 (and thus above the upper surface 22 of the preexisting roof 12) independent of the slope or irregularities that may be present in the preexisting roof 12. For example, FIG. 2A illustrates the adjustable feature of the support spacer 26 where the upper beam 30 is in a substantially non-parallel relationship with the base support member 28 at a selected height. The phantom lines in FIG. 2A illustrate the support spacer 26 wherein the upper beam is secured in a substantially parallel relationship with the base support member 28 at a second selected height. FIG. 2B illustrates the adjustable feature of the support spacer 26 when the upper beam 30 is substantially horizontally disposed in a parallel relationship with the same support member 28 at a first selected height; the phantom lines illustrate the support spacer 26 wherein the upper beam is secured in a substantially parallel relationship with the base support member 28 at a second selected height. The distance between the base support member 28 and the upper beam 30 can be varied between the geometrical limits of the angular disposition of the adjustable web assembly 32.

The base support member 28 of each support spacer 26 in the roof section 24 is secured to the preexisting roof 12 by any suitable fastener assembly, such as by a plurality of self-drilling, self-tapping screws, one such screw 34 shown in FIG. 7.

The web assembly 32 of the support spacer 26 comprises a plurality of spacer webs 36 having a first end portion 38 and an opposed second end portion 40. The first end 38 of each of the spacer webs 36 is secured to the base support member 28 of the support spacers 26, and the opposed second end 40 of the spacer webs 36 is secured to the upper beam 30. The angular disposition of the spacer webs 36 of the web assembly 32 is such that the upper beam 30 is maintained in a proper, selected relationship with the base support member 28 and thus the preexisting roof 12. The upper beam 30 may be secured via its adjacently disposed ends as required.

A plurality of roof panel members 42 are positioned upon and supported by the support spacers 26 to substantially extend across and form a continuous plane across the upper beams 30. The roof panel members 42 are secured to the upper beams 30 in such a manner that the roof system 10 is provided with a selected plane substantially independent of the plane of the preexisting roof 12. Any suitable panel fastener assemblies can be employed for connecting the roof panel members 42 to the support spacers 26, such as self-drilling, self-tapping screws.

The roof system 10 further comprises a flashing assembly 50 for interconnecting a wall member of the building structure 14, such as wall member 18, to the adjacently disposed roof panel members of the roof section, such as the roof panel member 42 of the roof section 24. The flashing assembly 50 is desirably formed of a plurality of facade panel members 52 which are interconnected so as to extend substantially along the length of the roof section and provide a substantially continuous surface along the length of the roof section 24 as shown in FIG. 1.

Referring now to FIG. 3, the construction of the flashing assembly 50 and the connection of the facade panel members 52 to the wall members 18 and to the adjacently disposed roof panel members 42 is illustrated. Each of the facade panel members 52 is provided with an upper end 54 and an opposed lower end 56. The upper end 54 is connected to the adjacently disposed edge portion of a roof panel member, such as the adjacent edge portion of the roof panel member 42, via a roof connector assembly 58; and the lower end 56 of each of the facade panel members 52 is connected to the upper end portion of an adjacent wall member 18 of the building structure 14 via a wall connector assembly 60.

Referring now to FIGS. 3 and 4, the roof connector assembly 58 comprises a spacer spanner member 62 and a support member 64. The spacer spanner member 62, a substantially "L" shaped member having a first leg portion 68 and a substantially normally disposed second leg portion 70, is positioned over the end portions of the upper beam 30 of each of the aligned support spacers 26 in the roof section 24 so as to extend across the upper beam 30 of each of the support spacers 26 in the roof section 24. The first leg portion 68 of the spacer spanner member 62 is disposed substantially adjacent the upper surface of each of the upper beams 30 so that the second leg portion 70 abuts the end of each of the upper beams 30 of the support spacers 26 substantially as shown in the drawings. The support member 64 comprises a first leg portion 72, a body portion 74 and a second leg portion 76; and a flashing member 77 is formed on the second end portion of the support member 64, with the flashing member 77 being an arcuately shaped member. The first leg portion 72 of the support member 64 is positioned over the first leg portion 68 of the spacer spanner member 62 so that the body portion 74 of the support member 64 is substantially normally disposed to the longitudinal axis of the upper beams 30, and the second end portion 76 of the support member 64 extends outwardly from the ends of the upper beam 30 of the support spacer 26. The length of the support member 64 substantially corresponds to the length of the spacer spanner member 62 so that the support member 64 extends across the end portions of each upper beam 30 of the support spacer 26 forming a roof section 24.

The first leg portion of the spacer spanner member 64 and the second leg portion 76 of the support member 64 are secured to the upper beam 30 of the support spacer 26 by any suitable means, such as be self-drilling, self-tapping screw 84. The upwardly turned flashing member 77 is connected to the upper end 54 of the facade panel members 52 of the flashing assembly 50 by any suitable means, such as self-drilling, self-tapping screws 88. The connection of the spacer spanner member 62, the support member 64 and the flashing member 77 enables one to readily connect the upper end 54 of the facade panel member 52 to the upper beam 30 of the support spacer 26. Further, the upwardly turned flashing member 77 formed as a part of support member 64 of the roof connector assembly 58, in combination with the wall connector assembly 60, enables the lower end 56 of the facade panel members 52 to be connected to the upper end portion of the adjacent wall member 18, regardless of the angular disposition of the facade panel members 52. Once the facade panel members 52 have been connected to the upper beams 30 of the support spacers 26 via the roof connector assembly 58, the roof panel member 42 can be disposed over the roof connector assembly 58 and connected thereto by any suitable means, such as self-tapping, self-drilling screws 89.

Referring now to FIGS. 3 and 5, the wall connector assembly 60 connecting the lower end 56 of each of the facade panel members 52 to the upper end portion of the wall member 18 is illustrated. The wall connector assembly 60 comprises a connector plate 90 having a first end portion 92, a body portion 94, and a downwardly curved second end portion 96. The connector plate 90 is positioned over the wall member 18 so that the first end portion 92 abuts the wall member 18 and is connected thereto by any suitable means, such as screw or shot pin 98. The body portion 94 and the downwardly curved end portion 96 of the connector plate 90 are disposed above the upper end portion of the wall member 18, preferably in a spatial relationship therewith as shown in FIG. 5 of the drawings. The lower end 56 facade panel member 52 is connected to the end portion 96 of the connector plate 90 by any suitable means, such as self-drilling, self-tapping screws 100. The unique configuration of the connector plate 90, including the downwardly curved end portion 96, in combination with the configuration of the arcuately shaped flashing member 77 formed on the second end portion 76 of the support member 64, enables one to connect the facade panel members 52 to the adjacent roof panel 40 and to the upper end portion 56 of the wall member 18. For example, the particular angular position of each of the facade panel members 52 can vary along the length of the roof section 24 because of the degree of extension of the support spacers 26, and the elevation of the roof section 24 above the upper end portion of the wall member 18. When the facade panel members 52 are corrugated, plug members 99 and 101, indicated in phantom in FIGS. 4 and 5, are positioned within the voids of the corrugations of the facade panel members 52.

The flashing assembly 50 provides a unique method for interconnecting the roof panel members 42 to the upper end portion of the supporting wall member 18. However, when the assembled facade panel members are subjected to temperature variations, the facade panel members 52 tend to expand and contract. The expansion and contraction of the facade panel members 52, or construction errors, may result in partial separation of the joints formed between adjacent facade panel members 52 so that wind driven rain or moisture may penetrate the flashing assembly 50. Thus, the flashing assembly 50 desirably further comprises a flexible membrane 102 disposed under the facade panel members 52 and extending between the roof panel member 42 and the adjacent wall member 18. The flexible membrane 102 functions as an internal gutter system to conduct water and moisture from under the roof system 10.

To secure the flexible membrane 102 in position below the facade panel members 52, one end portion 104 of the flexible membrane 102 is positioned adjacent the upper end portion of the wall member 18 and secured thereto via connector plate 90 and the screws 98 of the wall connector assembly 60. The flexible membrane 102 is then stretched taut, and a second end 106 of the flexible membrane 102 is disposed over the spacer spanner member 62 and secured thereto via the support member 64 and the screws 84. The second end portion 106 of the flexible membrane 102 is then lapped over the support member 64. The flexible membrane 102 is disposed below the facade panel members 52 in a spatial relationship with the facade panel members 52 so that the facade panel members 52 do not contact and tear the flexible membrane 102.

As previously stated, the roof system 10 of the present invention employs adjustable support spacers 26 capable of being selectively adjusted to provide a desired planar surface for the roof panel members 42 independent of the planar surface of the preexisting roof 12 on which the roof system 10 is secured. Referring now to FIG. 7, the connection of the web assembly 32 to the base support member 28 and to the upper beam 30 of the support spacer 26 are shown in detail. As mentioned above, the web assembly 32 comprises a plurality of spacer webs 36, one of the spacer webs 36 being illustrated in FIG. 7. It should be noted that the angular disposition of the spacer webs 36 may be different for each support spacer 26, and that the angular disposition of the spacer webs 36 will be dependent upon the selected height of the upper beam 30 of the support spacer 26, the relationship of the upper beam 30 to the base support member 28, and the plane of the preexisting roof 12.

The upper beam 30 and the base support member 28 of the support spacer 26 are illustrated as channel members, the channel portion of the base support member 28 adapted to receive the opposed first end portion 38 of the spacer web 36. The spacer web 36, also a channel member, further comprises a flange member 112 formed on the first end portion 38 thereof, and a flange member 114 formed on the opposed second end portion 40 thereof. The first end portion 38 of the spacer web 36 then is secured to the base support member 28 of the support spacer 26 via the flange member 112 and a self-tapping, self-drilling screw 116. The second end portion 40 of the spacer web 36 is secured to the upper beam 30 of the support spacer 26 via the flange member 114 using a self-tapping, self-drilling screw 118, or other suitable fastening means such as welding. The second end portion 40 of the spacer web 36 is skewed up to about fifteen degrees so that, in the assembled position of the base support member 28, the upper beam 30 and the spacer web 36, the upper beam 30 can be maintained in a selected relationship with the base support member 28 and disposed substantially above the base support member 28 independent of the planar surface of the preexisting roof 12. As previously stated, each spacer web 36 is positioned independently of the adjacent spacer webs so that the desired relationship between the upper beam 30 and the base support member 28 of the support spacer 26 is maintained.

When the support spacer 26 has been properly positioned on the preexisting roof 12 so its upper beam 30 is disposed in the selected position, and each of the adjacent support spacers 26 have likewise been so positioned, the roof panel member 42 is positioned on the upper beams 30 of the adjustable spacers 26 and secured thereto by any suitable means, such as a corrugation support clip 120 and suitable fastening means, such as self-drilling, self-tapping screws (not shown).

Referring now to FIG. 6, the eave portion of the roof system 10 is illustrated in combination with an external gutter assembly 130. The eave portion of the roof section, such as roof section 24, is connected to the top portion of a wall member of the building structure 14, such as a wall member 132 via an eave connector assembly 134. The eave connector assembly 134 is a plate member having a first leg portion 136 and a second leg portion 138. The first leg portion 136 is disposed adjacent to the interior upper portion of the wall member 132 and secured thereto by any suitable means, such as self-tapping, self-drilling screws 140 or power driven shot pins so that the second leg portion 138 is disposed above the wall member 132 to abuttingly support the eave portion of the roof section 24 substantially as shown. The roof section 24, which comprises a plurality of roof panel members 42, can be connected to the second leg portion 138 of the eave connector assembly 134 by any suitable means, such as self-tapping, self-drilling screws 142.

The external gutter assembly 130, a trough member extending the length of the eave portion of the roof section 24, comprises a first side 142; a spatially disposed second side 144; a bottom plate 146 interconnecting the first and second sides 142, 144; and an upper flange 148 connected to the upper end of the first side 42 and disposable adjacent to the second leg portion 38 of the eave connector assembly 134. The external gutter assembly 130 is positioned upon and supported by the upper end portion of the wall 132 and secured to the second leg portion 138 of the eave connector assembly 34 via the screws 142. The external gutter assembly 30 further comprises a down spout 150 connected to the bottom plate 146 at a position external to the wall member 132, the down spout 150 openly communicating with an opening (not shown) in the bottom plate 146 so that water collected by the trough member of the external gutter assembly 130 is removed therefrom via the down spout 150. The external gutter assembly 130 is further provided with end cap plates, such as end cap plate 152, for closing the ends of the trough member.

In order to more fully describe the present invention, the method of erection of the roof system 10 will now be described. In the formation of the roof section 24 on the preexisting roof 12 of the building structure 14, the initial construction procedures involve the removal of any interfering matter connected to the top portion of the wall members of the building structure. Once the portions of the building structure 14 have been suitably cleared of any interfering material, the eave connector assembly 134 is secured to the wall member located adjacent the eave portion of the roof system 10. The first leg portion 136 of the eave connector assembly 34 is secured to the inner upper portion of the wall member 132 by a plurality of screws 140 so that the second leg portion 138 of the eave connector assembly 134 is disposed a selected height relative to the upper end portion of the wall member 132.

Another step in the construction of the roof system 10 is the erection of the support spacers 26 on the preexisting roof 12 of the building structure 14. The base support member 28 of the support spacer 26 is secured to the preexisting roof 12 by a plurality of self-tapping, self-drilling screws, or by any suitable means, so that the base support member 28 is spatially disposed, and preferably substantially parallel, to the eave connector assembly 134. The adjustable web assembly 32 of the support spacer 26, which comprises plural spacer webs 36, is connected to the base support member 28 and the upper beam 30 so that the upper beam 30 is disposed in a substantially horizontal position at a desired selected height above the existing roof 12. The support spacer 26 is temporarily braced so that the spacer webs 36 are maintained in proper position during construction of the roof system 10.

The base support member 28 of the support spacer 26 is then positioned upon the preexisting roof 12 and secured thereto by any suitable means, such as the self-tapping, self-drilling screws 34. The number of support spacers 26 employed in the formation of the roof section 24 will vary depending upon the overall length of the roof section 24, but desirably, the support spacers 26 are positioned on the preexisting roof 12 so as to be spaced approximately five feet apart. Once the base support members 28 of each of the spacers 26 have been secured in the desired position on the preexisting roof 12, a tightline is attached to the new roof high point 222 and to the new roof low point 224 as illustrated in FIG. 1. The adjustable web assembly 32 of each adjustable roofing support spacer 26 disposed between the adjustable spacers and the eave connector assembly 134 are elevated so that when the upper beam 30 of each is secured to the respective web assembly 32, and the first end portion 38 is secured to the base support member 28, the upper beam 30 of each support spacer 26 is positioned so as to be aligned relative to the tightline and in a substantially common plane with the support spacer 26 at the eave connector 134. As noted above, upper beams 30 of adjacent support spacers 26 are joined end to end.

Once the support spacers 26 have been properly positioned on the preexisting roof 12, the spacer spanner member 62 of the roof connector assembly 58 is positioned over the end portions of the upper beams 30 of the aligned support spacers 26 forming the roof section 24 so that the spacer spanner member 62 extends across the upper beams 30. If the flexible membrane 102 is to be positioned below the facade panel members 52 of the flashing assembly 50, the first end portion 104 of the flexible membrane 102 is positioned adjacent the upper end portion of the wall member 18, and secured thereto via the connector plate 90 of the wall connector assembly 60 and a plurality of screws 98. The second end of the flexible membrane 102 is then laid over the spacer spanner members 62 and secured to the spacer spanner 62 via the support member 64 and a plurality of screws 84; thus, any water penetrating the flashing assembly 50 will be collected and drained to the lower end of the flexible membrane 102 and out of the building where sections of connector plate 90 join each other end.

After the flexible membrane 102 has been secured between the wall structure 18 and the spacer spanner member 62 as described above, one end of facade panel 52, such as lower end 56, is connected to the downwardly curved end portion 96 of the wall connector assembly 60 by a plurality of screws 98; and the upper end 54 of each of the facade panel member 52 is connected to the flashing member 77 of the roof connector assembly 58 via a plurality of screws 88. During the attachment of the facade panel members to the roof connector assembly 58 and the wall connector assembly 60 as heretofore described, the facade panel member 52 is interconnected to adjacent facade panel members 52.

With the gutter assembly 130 positioned on the top portion of the wall member 132, and with the facade panels 52 in place, the roof panel members 42 are positioned across the upper beams 30 of the spacers 26 and secured thereto by a plurality of screws 142. It should be noted that by securing the end portions of the roof panel members 42 to the wall connector assembly 134, the gutter assembly 130 is secured to the wall member 130 below the eave portion of the roof system 10.

When the roof section 24 is of substantial length so that a plurality of roof panel members 42 are required to extend across the upper beams 30 of the support spacers 26, the roof panel members 42 are overlapped and connected together. The placement of the roof panel members 42 continues across the upper beams 30 of the support spacers 26 until approaching the opposed side of the building structure 14. At this point the flashing assembly 50 is secured to the other side of the building structure 14 and the upper beams 30 of the support spacers 26 via the roof connector assembly 58. Similarly, the flashing assembly 50 interconnects the support spacers 26 and the opposed wall (not shown) of the building structure 14 in a manner similar to that for attaching the facade panel members 52 of the flashing assembly 50 to the wall member 18.

It is often desirable to incorporate additional insulation material, such as insulation 220, on the preexisting roof 12. In such instances, the insulation 220 is positioned on the preexisting roof 12 prior to the attachment of the roof panel members 42 to support spacers 26 as described above.

The roof system 10 possesses some unique and advantageous properties other than those heretofore mentioned. For example, the roof panel members 42 are attached directly to a laterally structurally stable element so that the attachment of the roof panel members 42 thereto serves as a pinned connection. This attachment, in combination with the design of the support spacers 26, and the column strength of the roof panel members 42, enables the roof panel members 42 to retain substantial roof watertightness and load capacity as the roof panel members 42 expand and contract due to temperature variations or are subjected to loads. The unique design of the support spacers 26 is such that there is enough flexibility to allow the spacers to move slightly back and forth as the roof panel members 42 move due to temperature variations, while the pinned connection between the roof panel members 42 and the laterally stable elements provide a stable roof system in which the support spacers 26 will not rotate and collapse when the roof system 10 is subjected to a load.

The unique flashing assembly 50 provides a transition which allows differential movement between the wall members 18, which is rigid, and the roof system 10, which moves because of expansion and contraction, and yet maintains an attractive, structurally sound, watertight assembly. As the roof system 10 moves, the facade panel members 52 tend to rotate in the plane of the flashing assembly 50, and the roof connector assembly 58 and connector assembly 60 deflect to accommodate such rotation. Additionally, elongated holes (not shown) may be formed in the flashing member 77, the downwardly curved end portion 96, the opposed lower end 56 or the upper end 54 at the fasteners 88 and 100. These elongated holes will allow water caught by the flexible membrane 102 to drain to the outside of the building.

It is clear that the present invention is easily adaptable to various other types of construction and embodiments, some of which will be discussed hereinbelow.

FIG. 8 shows an inverted "V" embodiment of an adjustable web assembly 32A which comprises a first flange member 112A and an opposed second flange member 112B, a center flange member 114A and a first and second spacer web member 36A and 36B, respectively. The center flange member 114A is connectable to the upper beam 30A by any suitable means such as by welding.

The adjustable web assembly 32A may be attached at a factory to the upper beam 30A so it is substantially parallel and nested with the upper beam 30A for ease of shipping and later on-site erection, as is shown in FIGS. 9A and 9B. The spacer webs 36A and 36B would preferably be fabricated in the factory so that these members lay adjacent to the upper beam 30B, the assembly being shippable in a compact manner to minimize shipping costs. By factory connecting the spacer web assembly 32A to the upper beam 30B, another advantage is obtained in that the pieces are in the proper relationship with each other when they reach the field and are needed. It is often time consuming and expensive to locate, separate and bring the various components into proper position in on-site assembly. The field assembly of the upper beam 30A and adjustable web assembly 32A to base support member 28A is accomplished by moving the web members 36A and 36B out from the upper beam 30A to an angular position so as to approximate the selected height of the new roof from the upper beam 30A to the base support member 28A. The flange members 112A and 112B are bent to a position that the plane of the flanges 112A and 112B are substantially the same as the base support member 28A. Final adjustment is made by moving flanges 112A and 112B different distances apart such that the upper beam 30A is raised to the height of the tightline discussed hereinabove. The flange 112A is secured to the base support member 28A by screws 34A. A web member 36A, at the opposing end of the support spacer 26A, is attached in a similar manner upon positioning the upper beam 30A at the appropriate height.

The web assembly 32A may have scores 250 made during the manufacturing process to facilitate erection while on-site, as shown in FIG. 8, at the first and second end flanges 112A, 112B and at the first and second sides of the center flange member 114A. On-site erection will be as discussed above, with the additional steps of bending the web members 36A and 36B downwardly at the appropriate angle to achieve the selected height of the new roof. The first and second end flanges 112A, 112B can be bent to the appropriate angle such as by bending with duckbill pliers (not shown). As mentioned, the first and second end flanges 112A, 112B are attached to the base support member 28A by screws 34A.

FIG. 10 is a view of the present invention utilizing the inverted "V" adjustable web assembly 32A showing the position of the first and second web members 36A and 36B where the plane of the upper beam 30A is sloped in relationship to the plane of the base support member 28A. Erection of this embodiment is as discussed hereinabove.

FIG. 11A illustrates a side view of a base plate 29A which is usable in lieu of the base support member 28A. The base plate 29A is connectable to the adjustable web assembly 32A such as by screws 34A. The base plate 29A, also shown in top plan view in FIG. 11B, is connectable to the preexisting roof 12 such as by welding to the preexisting roof structurals. In certain instances it may be desirable to connect the flange members 112A and 112B directly to the underlying preexisting roof 12. This is done by removing portions of the preexisting roof 12 so that the flange members 112A, 112B rest on and are connected to structurally sound portions of the preexisting roof 12. The connection between the flange members 112A and 112B and the preexisting roof 12 would, again, be made such as by self-tapping, self-drilling screws.

FIG. 12 is an enlarged view of the upper portion of the adjustable web assembly 32A to illustrate the placement of the bend scores 250 made during factory fabrication and are used to facilitate bending of the first and second web members 36A, 36B to the appropriate angle to elevate the upper beam 30A to the desired height of a new roof.

Figure 13:
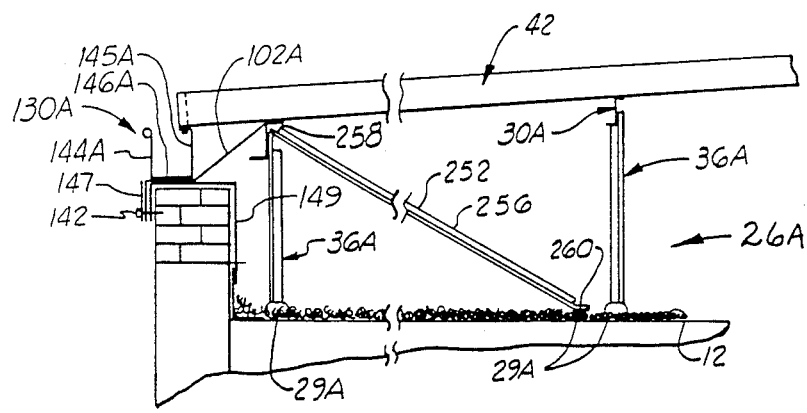
FIG. 13 is an isometric view showing the use of a brace member for alteral stability.

FIG. 13 is a view showing the use of a brace 252 for lateral support of the support spacers 26. The brace 252 comprises a brace member 256 with first and second flange member 258 and 260, respectively. The brace 252 may be manufactured of any suitable material such as a tubular or "L" beam stock, and then fabricated to form the first and second end flanges 258 and 260. Additionally, bend scores may be placed at the first and second end flanges 258 and 260 as discussed hereinabove. The first flange member 260 is connected to the preexisting roof 12 by self-tapping, self-drilling screw (not shown). The flange member 258 is connected to the upper beam 30A of a selected one of the support spacers 26 by self-tapping, self-drilling screws (not shown) so as to prevent lateral movement of the braced support spacer. Flexible membrane 102A is adapted to rest on the first interior support spacer 26A, and extends over the wall member 18 to pass under the gutter assembly 130A in a manner that water entering between roof 42 and gutter assembly 130A is drained to the exterior of the building by appropriate channels 146A extending over the lower portion of the flexible membrane 102A and gutter assembly 103A.

Figure 14:
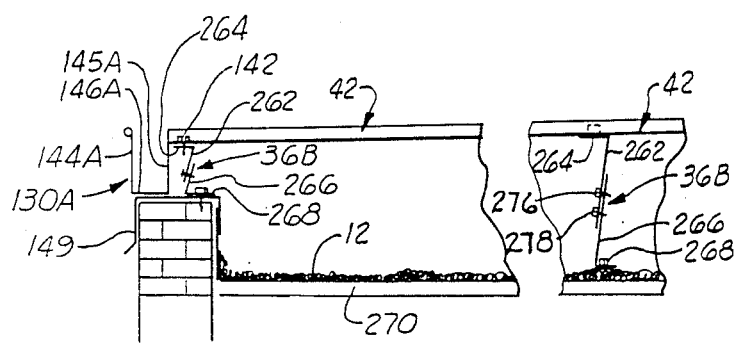
FIG. 14 is an isometric view of a "Z" embodiment of a support spacer.

FIG. 14 shows a "Z" support spacer assembly 36B comprising a first web member 262, a first flange 264, a second web member 266 and a second flange 268. The first web member 262 is adjustably overlappingly disposed to the second web member 266 and is adjusted to the selected height of the new roof in accordance with procedures discussed hereinabove. The first flange 264 is connectable to the roof panel 42 and the second flange 268 is connectable to preexisting roof 12 as discussed hereinabove. The first web 262 is connected to the second web 266 by one or more nut and bolt connectors inserted through slots in both the first web 262 and the second web 266 (slot not shown) such that loosening thereof will allow the two members to increase or decrease the amount of overlapping and thus the distance between the first and second flange 264 and 268. After the desired initial overlapping has been accomplished, the overlapping position is secured by connecting webs 262 and 266 with non-slip connections means such as by welding, or by self-tapping, self-drilling screws.

Figure 15:
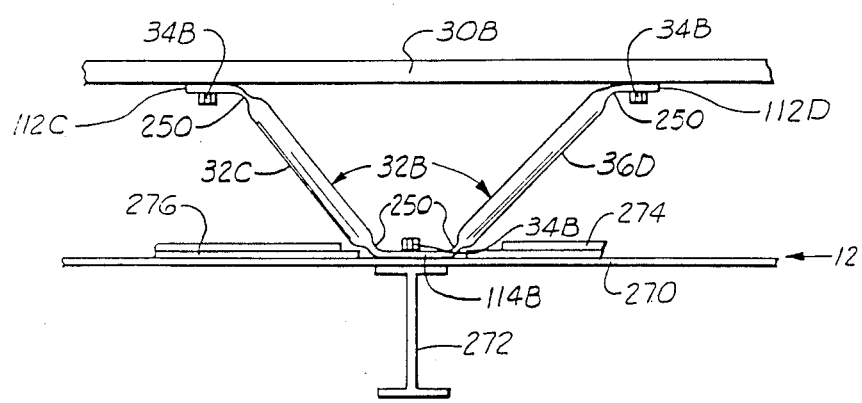
FIG. 15 is a view of a "tube" embodiment of web members.

FIG. 15 is an isometric drawing of an inverted "V" adjustable web assembly 32B fabricated from tubular stock and comprising first and second web members 36C and 36D, center flange member 114B and first and second end flange members 112C and 112D. The adjustable web assembly 32B may employ bend scores 250 at the flange members 114B and 112C and 112D as discussed hereinabove. After removing structurally weak or unsound material such as insulation 276 and water proofing material 274, the center flange member 114B is connectable to a structurally sound portion of the preexisting roof 12, such as beam 272. The first and second end flange members 112C and 112D may be connected to the upper beam 30A as discussed hereinabove.

FIG. 16 shows an end view of the adjustable web assembly 32A which comprises a first "L" beam member 30B and an opposed second "L" beam member 30C. The first and second "L" beam members 30B and 30C may be connected to the adjustable web member 32A as discussed hereinabove, such as by a weld connection. FIG. 16 also illustrates the end view of the base support member 28A.

It will become clear that the present invention and its various embodiments may be reversed in its construction and erection according to varying construction and manufacturing requirements. For instance, the inverted "V" adjustable web assembly 32 could be utilized as a "V" adjustable web assembly 32B as shown in FIG. 15, with the center flange 114B being connectable to the preexisting roof 12 structurals; the first and second web members 36C and 36D extended upwardly from the preexisting roof 12 to the selected height of the new roof; and the first (upper) beam 30A connected to the first and second flanges 112B. The erection methods would be substantially the same as those discussed hereinabove.

While it was originally contemplated that the adjustable spacers described in my above mentioned patents and patent applications would be used to support new metal roofs over old worn-out, flat roofs, it has also been discovered that these adjustable spacers are useful to support other types of sloped roofs such as those generally described as single-ply. A single-ply roof system refers to the use of an elastomeric, flexible membrane stretched over supporting members to form the roofing envelope. Such membranes are commercially available and are frequently formed into a substantially unitary membrane comprised of longitudinally extending strips which are cohesively, adhesively or mechanically joined together. It is common to adhere the resulting membrane envelope to an underlying roofing substrate, or to mechanically attach the membrane via penetrating fasteners, the fastener penetrations then being sealed by various sealants. However, to date, a good single-ply sloped reroofing system having desirable performance and cost characteristics has not been developed.

The preferred method of providing slope beneath a single-ply membrane today is to use tapered foam blocks to slope the single-ply membrane. This has proved to be very expensive and cumbersome. For a reroof to be commerically successful it must have a good sloped single-ply capable of being installed in a manner that avoids the expense and time involved in removing the old worn-out roof. The new roof must be spaced above at least a portion of the old roof using an appropriate secondary structural system such as taught in my above mentioned patents.

The single-ply roof system of the present invention will run up and down slope and can be loose laid or adhered. If the material is to be loose laid, the single-ply material will be purchased in relatively narrow but long strips. Ideally, the strips will be long enough to go across the entire roof, that is, from eave to ridge to eave. The width of the strips will be limited to that which will resist the required wind uplift load. As will become clear below, these single-ply membrane strips will be joined side-by-side via mechanical members without penetrating the water side of the single-ply membrane strips. The entire single-ply membrane roofing system is designed to resist an appropriate wind uplift and to be watertight when subjected to normal construction and roof traffic.

The present invention takes advantage of readily available materials that are easy and inexpensive to obtain, such as corrugated metal deck, plywood or particle board. The erection of the present roofing system is easily understandable by both the user and installer; it avoids incorporating many small pieces that require intricate erection techniques; and it minimizes such support materials as sealants, screws and other small pieces. No sharp edges remain in the present invention to penetrate the single-ply membrane utilized therein.

Depicted in FIG. 17 is a partially broken view of a roof system 300 supported over a preexisting roof 12A via support spacers 26B which are variations of the adjustable roofing spacers 26 described hereinabove. Supported on the upper beams 30B of the support spacers 26B are corrugated metal panels 302 of conventional design. Overlaying the panels 302 is a membrane layer 304 which is comprised of side-by-side membrane strips 306 sealingly interconnected along adjacent and overlapping edges thereof via fastener assemblies 308, one of which is partially viewable in FIG. 17.

Figure 18:
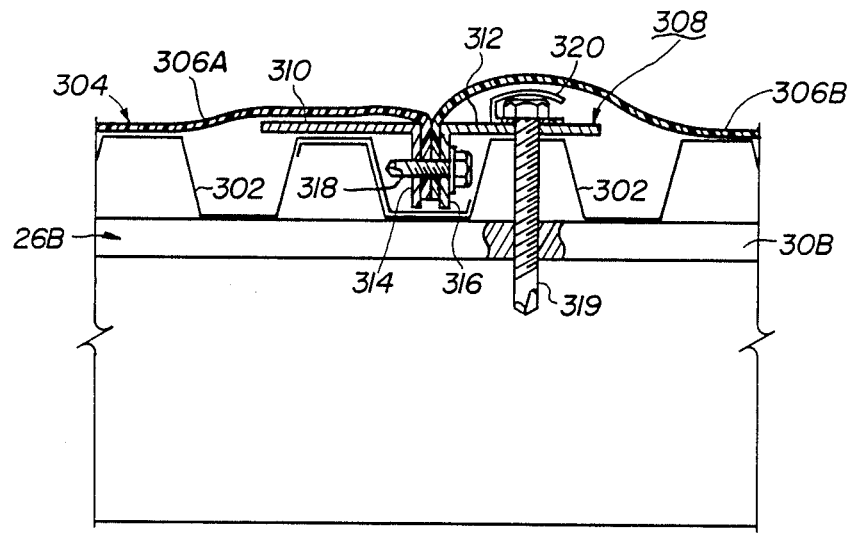
FIG. 18 is a cross-sectional view of a fastener assembly used to seal the adjacent edges of the membrane strips of the roof system of FIG. 17.

A cross-sectional view of one of the fastener assemblies 308 is shown in FIG. 18 in which the membrane strips are designated as 306A and 306B for clarity. Each fastener assembly 308 comprises a first gripping member 310 and a second gripping member 312, which have membrane griping portion 314 and 316, respectively. The edges of the membrane strips 306A, 306B are disposed between the membrane gripping portions 314 and 316. A securing connector 318 in the form of self-drilling, self-tapping screws are provided to tightly press the membrane gripping portions 314 and 316 together to sealingly grip the edges of the membrane strips 306A, 306B therebetween.

Figure 19:
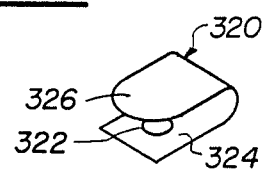
FIG. 19 is an isometric view of a self-positioning screw head cover.

The fastener assembly 308 is secured to the upper beams 30B of the underlying support spacers 26B via self-drilling, self-tapping screws 319 which pass through the panels 302. The heads of the conventional screws 319 often have burrs which can damage the overlaying membrane layer 304. This damage can be prevented by providing a self-positioning separator 320 for each of the screws 319, one of which is shown in greater detail in FIG. 19. As shown therein, the separator 320 is generally a C-shaped member having an aperture 322 through a base portion 324 and having a bolt cover portion 326. Preferably, the separator 320 is made from a relatively thin, flexible plastic material so that the cover portion 326 can be temporarily bent to permit placement of the body of the screw 319 through the aperture 322, and once released, the cover portion 326 will return to its original position to cover the head of the screw 319. During installation of the screw 319, the cover portion 326 can be bent to gain access to the screw head by a driving tool and will return to overlay the screw head once installed.

To install the fastener assembly 308, the membranes strip 306B is positioned over the membrane strip 306A such that the edges of the membrane strips 306A, 306B are aligned. The first gripping member 310 is placed beneath the membrane strip 306A and the second gripping member 312 is placed over the membrane strip 306B so that the membrane gripping portions 314, 316 thereof are disposed along the membrane edges. The screws 318 are installed through the membrane gripping portions 314, 316, and the fastener assembly 308 is rotated to the position shown in FIG. 18. Next, the fastener assembly 308 is attached to the underlying support spacer 26B via the screws 319, and the membrane strip 306B is extended over the underlying second gripping member 312 as shown. This sequence is repeated at the edges of each adjacent membrane strip as the membrane layer 304 is formed. Of course, the fastener assembly 308 could as well be attached to the support spacer 26B prior to securing the membrane gripping portions 314, 316 together to grip the membrane strip edges.

Figure 20:
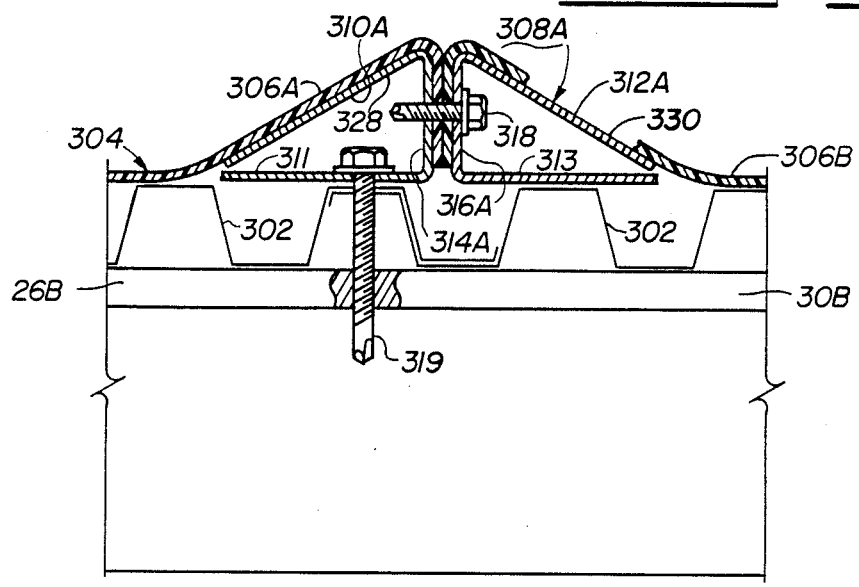
FIG. 20 is a view similar to FIG. 18 but of another fastener assembly.

Shown in FIG. 20 is another embodiment of a fastener assembly 308A which serves the same function as that described above for the fastener assembly 308. The fastener assembly 308A has a first gripping member 310A and a second gripping member 312A. The first gripping member 310A has a membrane gripping portion 314A and a base leg 311; and the second gripping member 312A has a membrane gripping portion 316A and a base leg portion 313. The screws 318 can be placed through either of the base leg portion 311 or 313 to secure the fastener assembly 308A to the underlying support spacer 26B. In like manner to that described above for the fastener assembly 308, the securing connector 319 in the form of self-drilling, self-tapping screws tightly press the membrane gripping portions 314A and 316A together to sealingly grip the edges of the membrane strips 306A and 306B therebetween. Membrane support legs 328 and 330 are provided for the first and second gripping members 310 and 312, respectively, to support the membrane and to protect same from the underlying heads of the securing screws 319. In this embodiment, the separators 320 provided with the fastener assemblies 308 are not necessary. For access to the heads of the screws 319, appropriately disposed apertures or slots (not shown) may be provided at intervals along the membrane support legs 328 and 330 so that a driving tool can be used to install the screws 319.

The installation of the fastener assemblies 308A will be similar to that described hereinabove for the fastener assemblies 308. Therefore, further discussion of same need not be provided.

Figure 21:
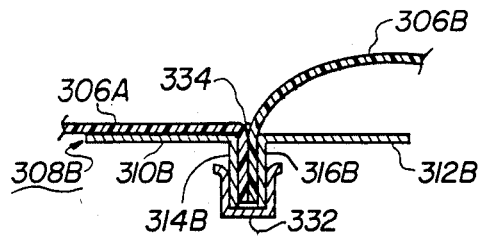
FIG. 21 is a cross-sectional view of yet another fastener assembly.

One other embodiment of a fastener assembly 308B is shown in FIG. 21. The fastener assembly 308B is similar to the fastener assembly 308, and comprises a first gripping member 310B and a second gripping member 312B which are disposed to grip the edges of the flexible membranes strips 306A and 306B as described above for the fastener assembly 308. A channel shaped clamp 332 serves as the securing connector, and has a cross-sectional interior dimensioned to receive the membrane gripping portions 314B, 316B with the edges of the flexible membranes strips 306A, 306B therebetween. In practice, the connector clamp 332 would preferably be made of a metal or plastic having spring like characteristics in its upstanding legs, and once driven over the composite of membrane gripping portions 314B, 316B and the double membrane thickness held therebetween, the connector clamp 332 will tightly clamp the joint between adjacent membrane strips as shown. While the fastener assembly 308B can be attached to underlying support structures as shown for the fastener assembly 308 (in which case screws 319 with separators 320 would be used), the fastener assembly 308B can also serve to seal the adjacent edges of the flexible membrane strips mid span to the underlying support spacers 26B.

Figure 22:
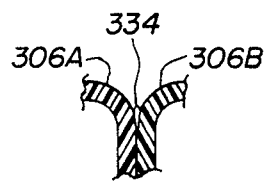
FIG. 22 is an enlarged view showing the placement of a sealant bead.

Preferably, a bead of sealant 334 is disposed to seal between the membrane strips 306A and 306B at the location indicated in FIG. 21 (also indicated in the enlarged view of FIG. 22). This serves to provide a better seal, and also, permits the connector clamp 332 to be relatively short, for example, two feet or less in length, with multiple connector clamps 332 disposed at spaced apart intervals along the joint between the membrane strips 306A and 306B.

It is expected that one may prefer to adhere the fastener assembly 308 to the corrugated metal panels 302 in median portions thereof When this is accomplished with an appropriate adhesive (not shown), the flexible membrane layer 304, when sealingly joined via the fastener assemblies 308, 308A or 308B, will form a very stable reroofing system when used in conjunction with the underlying adjustable support spacers 26B. Also, it is expected that the periphery, or outer edges, of the flexible membrane layer 304 will be sealingly connected to the wall members 18 in the manner described for the flexible membrane 102 or 102A in FIG. 5 or FIG. 13, described hereinabove, to serve a similar purpose.

It is clear that the present invention is well adapted to carry out the objects and to attain the ends and advantages mentioned herein as well as those inherent in the invention. While presently preferred embodiments of the invention have been described for the purposes of this disclosure, numerous changes may be made which will readily suggest themselves to those skilled in the art and which are encompassed within the spirit of the invention disclosed and as defined in the appended claims.

What is claimed is:

1. An improved roofing system for support over an underlying support surface, comprising:
   a plurality of adjustable roofing support spacers, each of which comprises:
      a first beam;
      a second beam supported by the support surface;
      connector means for connecting the second beam to the support surface; and
      adjustable web means for interconnecting the first and second beams and for supporting the first beam above the second beam in a selected plane independent of the slope of the support surface, the adjustable web means comprising a plurality of spacer webs and attaching means for attaching the spacer webs to the first and second beams and determining the relative disposition of the first and second beams so that the first beam is supported at a selected height along the length thereof above the support surface;
   a plurality of roofing members supported on the first beams of the support spacers; and
   membrane means secured over the roofing members for providing a protective roof layer thereover, the membrane means comprising:
      plural strips of elastomeric flexible membrane material strips supported by the roofing members disposed to be sealingly interconnected at adjacent edges of the membrane strips and
      fastener means disposed beneath the membrane strips along adjacent edges thereof for sealingly engaging such adjacent edges.

2. The roofing system of claim 1 wherein the fastener means comprises a plurality of fastener assemblies, each fastener assembly characterized as comprising:

a first gripping member disposed along a first membrane strip at one edge thereof;

a second gripping member disposed along a second membrane strip at one edge thereof, such edges of the first and second membrane strips being disposed in adjacent disposition to each other; and securing means for forcing the first and second gripping members together with the edges of the first and second membrane strips therebetween so that the edges of the membrane strips are sealingly pressed together and so that the interconnected membrane strips cover the fastener assembly.

3. The roofing system of claim 2 wherein each fastener assembly further comprises:

attaching means for attaching at least one of the first and second gripping members to one of the first beams of the underlying support spacers.

4. The roof system of claim 3 wherein the attaching means comprises a plurality of screw members.

5. The roof system of claim 4 wherein each screw member has a head portion and the fastener assembly further comprises:

separator means for separating the head portion of each screw member from the overlying membrane strips so that the membrane strips are protected from contact wherewith.

6. The roof system of claim 5 wherein the separator means comprises:

a self-positioning separator for each screw member having a body portion retained on the screw member and having a flexible cover portion removably extending over the head portion.

7. The roof system of claim 2 wherein the securing means comprises a plurality of screw members threadingly securing the first and second gripping members together.

8. The roof system of claim 7 wherein the screw members are self-drilling, self-tapping fasteners.

9. The roof system of claim 2 wherein the securing means comprises:

a plurality of channel shaped clamp members dimensioned to sealingly clamp the first and second gripping members of each fastener assembly against the edges of the membrane strips secured thereby.

10. The roof system of claim 2 wherein sealant is placed between adjacent edges of the membrane strips.

11. The roof system of claim 2 wherein each of the first and second gripping members of each fastener assembly is characterized as having a membrane gripping portion, a base portion and an overlying membrane support portion, wherein the securing means comprises a plurality of screw members, each of the screw members threading engaging the membrane gripping portions so that the adjacent membrane strip edges are tightly gripped between the membrane gripping portions of the first and second gripping portions, and wherein the attaching means comprises a plurality of headed screw members extending through of the base portion of a selected on of the first and second gripping members, the overlying membrane support portions separating the overlying membrane strips from the head portions of the screw members.

12. The roof system of claim wherein a portion of each membrane strip is adhered to the underlying roofing members.

13. The roof system of claim 1 wherein the underlying support surface is a preexisting roof.

14. A method for reroofing an existing roof of a structure to provide a new roof having a configuration substantially independent to that of the existing roof, the method comprising the steps of:

securing a lower segment of an adjustable first support spacer to the existing roof, the first support spacer having an upper beam and an adjustable web assembly disposed between and interconnecting the lower segment and upper beam;

securing a lower segment of at least one other adjustable support spacer to the existing roof, each other support spacer having an upper beam and an adjustable web assembly disposed between and interconnecting its lower segment and upper beam, the lower segment of each support spacer disposed in a selected relation with the lower segment of the first support spacer;

adjusting the web assemble of the first support spacer so that the upper beam thereof is disposed in a first determined relation with the existing roof;

adjusting the web assemble of each other support spacer so that the upper beam of each is disposed in another determined relation with the existing roof, the determined relation of each upper beam being selectively one of the same as the first determined relation and different from the first determined relation with the existing roof;

positioning at least one panel member on the upper beams of the first support spacer and each other adjustable support spacer so that the panel member is supported thereby;

connecting the panel member to the upper beams of the support spacers; and disposing an elastomeric flexible membrane over the panel members to provide a protective roof layer.

15. The method of claim 14 wherein the flexible membrane comprises plural strips of membrane material, and further comprising the step of:

sealing the edges of adjacent membrane strips by fastener assemblies disposed along and beneath the edges that grippingly press the adjacent edges together.

16. The method of claim 15 further comprising the step of:

attaching at least some of the fastener assemblies to the panel members.

17. The method of claim 16 wherein the step of attaching the fastener assemblies also attached same to the upper beams of the underlying support spacers.

18. The method of claim 14 further comprising the step of:

adhering at least a portion of the flexible membrane to the panel members.

* * * * *